(12) United States Patent
Oh et al.

(10) Patent No.: US 10,960,730 B2
(45) Date of Patent: Mar. 30, 2021

(54) VEHICLE RADIATION HEATER

(71) Applicants: HYUNDAI MOTOR COMPANY, Seoul (KR); KIA MOTORS CORPORATION, Seoul (KR); HANON SYSTEMS, Daejeon (KR)

(72) Inventors: Dong Hoon Oh, Daejeon (KR); Kil Sang Jang, Daejeon (KR); Soo Doo Park, Daejeon (KR); Tae Yong Park, Daejeon (KR); Yun Sub Chung, Daejeon (KR); Man Ju Oh, Yongin-si (KR); Jae Woong Kim, Hwaseong-si (KR); So La Chung, Seoul (KR)

(73) Assignees: HYUNDAI MOTOR COMPANY, Seoul (KR); KIA MOTORS CORPORATION, Seoul (KR); HANON SYSTEMS, Daejeon (KR)

( * ) Notice: Subject to any disclaimer, the term of this patent is extended or adjusted under 35 U.S.C. 154(b) by 310 days.

(21) Appl. No.: 15/759,470

(22) PCT Filed: Sep. 8, 2016

(86) PCT No.: PCT/KR2016/010091
§ 371 (c)(1),
(2) Date: Mar. 12, 2018

(87) PCT Pub. No.: WO2017/047982
PCT Pub. Date: Mar. 23, 2017

(65) Prior Publication Data
US 2018/0257456 A1 Sep. 13, 2018

(30) Foreign Application Priority Data

Sep. 14, 2015 (KR) .......................... 10-2015-0129382
Dec. 30, 2015 (KR) .......................... 10-2015-0189121

(51) Int. Cl.
*H05B 3/06* (2006.01)
*H05B 3/14* (2006.01)
(Continued)

(52) U.S. Cl.
CPC ......... *B60H 1/2215* (2013.01); *B60H 1/2226* (2019.05); *B60H 1/2227* (2019.05);
(Continued)

(58) Field of Classification Search
None
See application file for complete search history.

(56) References Cited

U.S. PATENT DOCUMENTS 2,502,148 A * 3/1950 Grothouse ............ F24D 13/022
392/437
4,032,751 A * 6/1977 Youtsey ................. H05B 3/146
219/538

(Continued)

FOREIGN PATENT DOCUMENTS

CN 101336564 A 12/2008
CN 203933978 U 11/2014
(Continued)

OTHER PUBLICATIONS

DE-102012104917-A1, Caspers, Dec. 2013, partial translation (Year: 2013).*
(Continued)

*Primary Examiner* — Joseph M. Pelham
(74) *Attorney, Agent, or Firm* — Brinks Gilson & Lione

(57) ABSTRACT

The present invention relates to a vehicle radiation heater being configured to perform heating by directly emitting radiant heat toward a passenger at an early stage of starting of a vehicle in winter. The vehicle radiation heater according to the present invention can be simple in structure, thereby being easy to manufacture, can quickly emit high-tempera-
(Continued)

ture radiant heat over the entire area of the heater, thereby enhancing rapid and comforting heating effects, and can maintain a constant temperature, thereby preventing a risk of overheating.

19 Claims, 23 Drawing Sheets

(51) Int. Cl.
  *H05B 3/16*  (2006.01)
  *H05B 3/26*  (2006.01)
  *B60H 1/22*  (2006.01)
  *H05B 3/42*  (2006.01)
  *H05B 3/40*  (2006.01)
  *H01C 7/02*  (2006.01)
(52) U.S. Cl.
  CPC ............ *H05B 3/06* (2013.01); *H05B 3/14* (2013.01); *H05B 3/16* (2013.01); *H05B 3/26* (2013.01); *H05B 3/40* (2013.01); *H05B 3/42* (2013.01); *H01C 7/02* (2013.01); *H05B 2203/02* (2013.01); *H05B 2203/023* (2013.01); *H05B 2203/032* (2013.01)

(56) References Cited

U.S. PATENT DOCUMENTS

| | | | | |
|---|---|---|---|---|
| 4,547,659 | A * | 10/1985 | Leary | H05B 3/56 174/520 |
| 4,733,057 | A * | 3/1988 | Stanzel | F24D 13/02 219/548 |
| 4,990,747 | A * | 2/1991 | Kondo | F24D 13/022 165/904 |
| 5,058,196 | A * | 10/1991 | Nakamura | F24C 7/043 126/91 R |
| 5,062,146 | A * | 10/1991 | Kagechika | H05B 3/267 219/553 |
| 5,592,647 | A * | 1/1997 | Yamauchi | F24D 13/022 392/432 |
| 5,607,609 | A * | 3/1997 | Sakuyama | B23K 1/0053 219/388 |
| 6,180,930 | B1 * | 1/2001 | Wu | F24H 3/0429 219/530 |
| 8,431,871 | B2 * | 4/2013 | Schmidt | B32B 17/10183 219/203 |
| 9,278,606 | B2 * | 3/2016 | Gu | B60H 1/2225 |
| 9,333,835 | B2 * | 5/2016 | Gu | B60H 1/034 |
| 9,686,823 | B2 * | 6/2017 | Gries | H05B 3/50 |
| 9,769,879 | B2 * | 9/2017 | Ota | B60H 1/2215 |
| 10,182,470 | B2 * | 1/2019 | Habata | F24H 3/0447 |
| 2008/0053981 | A1 | 3/2008 | Adachi et al. | |
| 2010/0176110 | A1 * | 7/2010 | Ogino | B60H 1/00271 219/202 |
| 2010/0224622 | A1 * | 9/2010 | Ceraso | H05B 3/30 219/540 |
| 2012/0061365 | A1 * | 3/2012 | Okamoto | B60H 1/2225 219/202 |
| 2012/0234932 | A1 * | 9/2012 | Okamoto | F24H 3/002 237/2 R |
| 2015/0110477 | A1 | 4/2015 | Ota et al. | |
| 2016/0059669 | A1 * | 3/2016 | Sagou | B60H 1/2226 392/435 |
| 2016/0059670 | A1 * | 3/2016 | Satzger | H05B 3/22 219/202 |
| 2016/0167482 | A1 * | 6/2016 | Oh | B60H 1/2225 219/202 |
| 2017/0129310 | A1 * | 5/2017 | Sagou | B60H 1/2215 |
| 2017/0144507 | A1 * | 5/2017 | Seki | B60H 1/00292 |
| 2017/0158898 | A1 * | 6/2017 | Xiao | C09D 11/106 |
| 2017/0223776 | A1 * | 8/2017 | Xie | H05B 3/32 |
| 2017/0321902 | A1 * | 11/2017 | Ishikawa | B60H 1/2215 |
| 2018/0297449 | A1 * | 10/2018 | Oide | B60H 1/2226 |
| 2019/0359032 | A1 * | 11/2019 | Sagou | H05B 3/20 |
| 2020/0196392 | A1 * | 6/2020 | Seki | B60H 1/22 |

FOREIGN PATENT DOCUMENTS

| | | | |
|---|---|---|---|
| CN | 104335678 A | 2/2015 | |
| DE | 102012104917 A1 * | 12/2013 | ............ H05B 3/286 |
| JP | 08-267647 A | 10/1996 | |
| JP | 2012-056531 A | 3/2012 | |
| JP | 2013-216155 A | 10/2013 | |
| KR | 10-2007-0034444 A | 3/2007 | |
| KR | 10-2008-0044372 A | 5/2008 | |
| KR | 10-1076191 B1 | 10/2011 | |
| KR | 10-2013-0024716 A | 3/2013 | |
| KR | 10-2014-0105640 A | 9/2014 | |
| KR | 10-2015-0098856 A | 8/2015 | |
| WO | WO-2012004971 A1 * | 1/2012 | ............ B60H 1/2225 |

OTHER PUBLICATIONS

International Search Report in PCT/KR2016/010091 which is the parent application and its English translation—4 pages, (dated Dec. 2, 2016).
Chinese Office Action dated Apr. 14, 2020 from the corresponding Chinese Application No. 201680051221.9, 9 pp.
Korean Office Action dated Sep. 15, 2020 from the corresponding Korean Application No. 10-2015-0189121, 5 pp.
Korean Office Action dated Oct. 27, 2020 from the corresponding Korean Application No. 10-2015-0129382, 3 pp.

* cited by examiner

FIG. 1 "PRIOR ART"
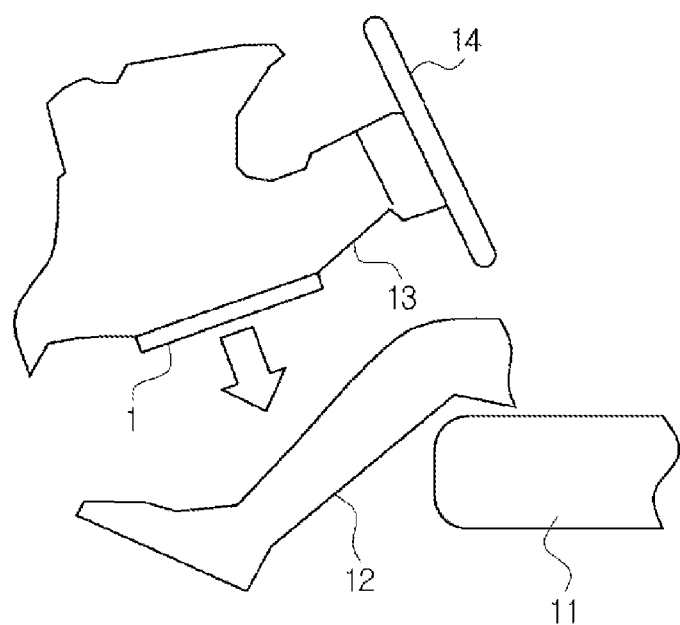

FIG. 2 "PRIOR ART"
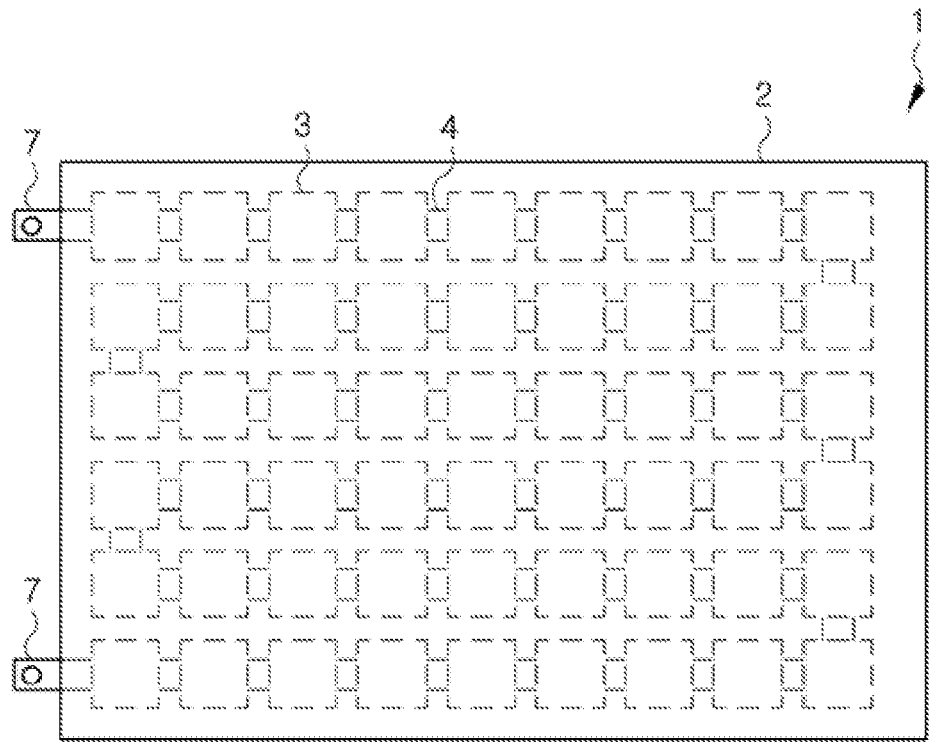

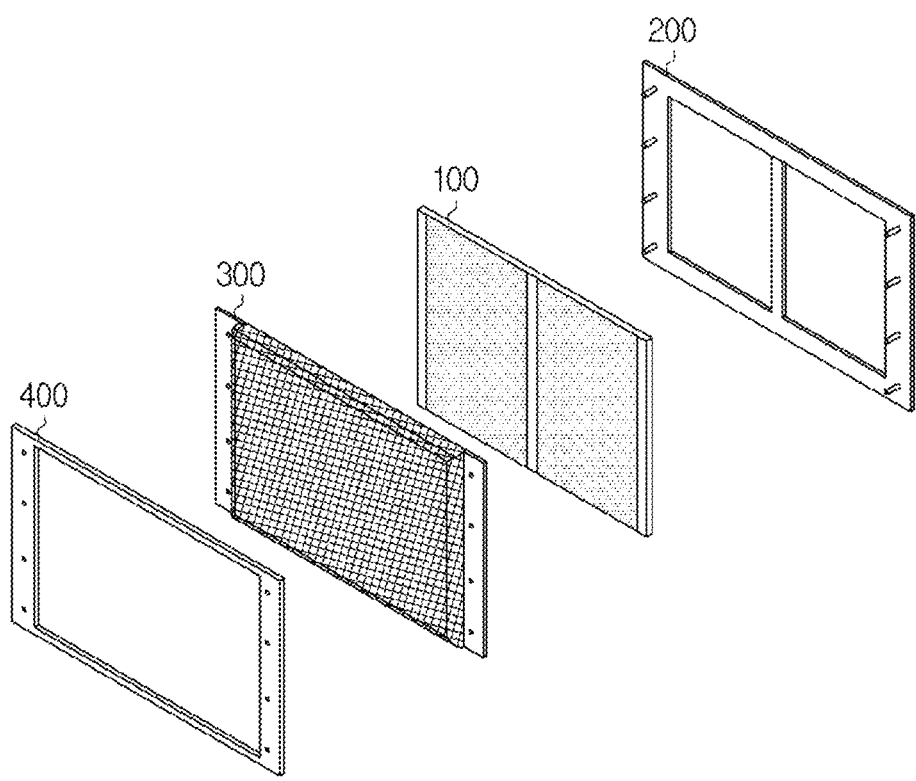

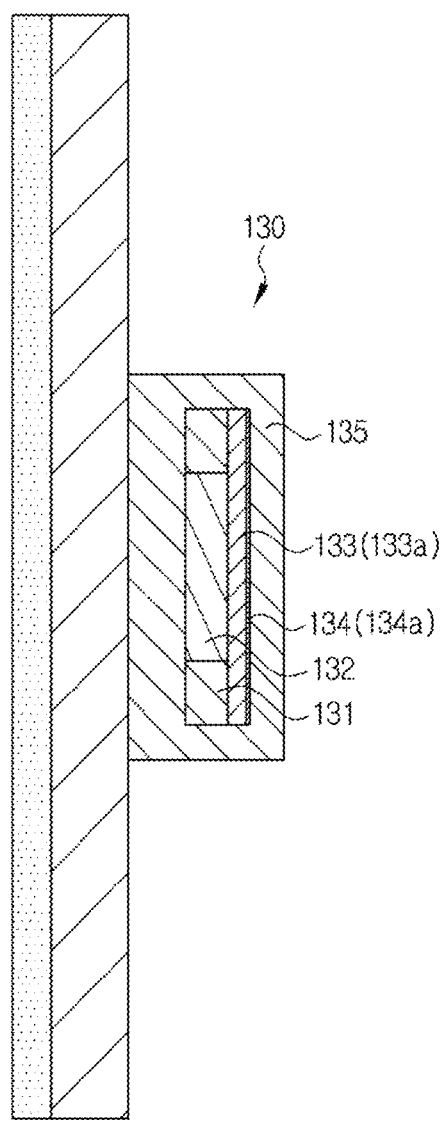

VEHICLE RADIATION HEATER

TECHNICAL FIELD

The present invention relates to a vehicle radiation heater, the vehicle radiation heater being configured to perform heating by directly emitting radiant heat toward a passenger at an early stage of starting of a vehicle in winter, wherein quick emission of high-temperature radiant heat is achieved, thereby enhancing rapid and comforting heating effects.

BACKGROUND ART

As well known in the art, since cooling water cannot be heated sufficiently at an early stage of starting of a vehicle in winter, the interior of the vehicle cannot be heated quickly. Accordingly, a vehicle radiation heater emitting radiant heat can be mounted in the interior of the vehicle to emit radiant heat directly toward a passenger such that a comfort heating effect is enhanced.

Such a vehicle radiation heater is mounted in the interior of the vehicle at a position of the lower side of a dashboard, a steering column of a driver's seat side, a glove box of a passenger seat side, or a backrest of a front seat, etc., and emits radiant heat directly toward legs of a passenger, thereby performing quick heating in the interior of the vehicle.

For example, as shown in FIG. 1, a conventional vehicle radiation heater 1 is configured such that the vehicle radiation heater is mounted on a lower surface of a steering column 13 connected to a steering wheel 14 of a vehicle driver's seat, and emits radiant heat toward legs 12 of a driver sitting on a seat 11. As shown in FIG. 2, the vehicle radiation heater 1 has a structure in which a substrate 2, and a radiating portion 3, a heating portion 4, and a terminal 7 are provided on a substrate 2.

However, the conventional vehicle radiation heater is problematic in that the heat-resistant temperature of a material constituting the heater is limited, and the temperature of the surface of the heater cannot be sufficiently increased due to a concern of burns occurring upon contact with the body when the surface temperature is excessively increased. Accordingly, a rapid heating effect is deteriorated, and thus a passenger cannot feel sufficient warmth.

In addition, the conventional vehicle radiation heater is still problematic in that the heating portion is widely distributed such that concentration of the heat density is suppressed in order to prevent burns, leading to a complicated structure and thus it is difficult to manufacture. Moreover, there is a risk of overheating and fire due to malfunction or abnormal operation of the heater.

DOCUMENTS OF RELATED ART

Patent Document 1

Japanese Patent Application Publication No. 2014-003000 (2014 Jan. 9)

DISCLOSURE

Technical Problem

Accordingly, the present invention has been made keeping in mind the above problems occurring in the prior art, and an object of the present invention is to provide a vehicle radiation heater being configured to directly emit radiant heat toward a passenger at an early stage of starting of a vehicle in winter, thereby enhancing a comforting heating effect, wherein the vehicle radiation heater is simple in structure, thereby being easy to manufacture, quickly emits high-temperature radiant heat, thereby enhancing rapid and comforting heating effects, and maintains a constant temperature, thereby preventing a risk of overheating.

Technical Solution

In order to accomplish the above object, the present invention provides a vehicle radiation heater 100, including: a base member 120 made of a material having thermal conductivity, and provided on a first surface thereof with a radiation layer 110 provided to enhance emission performance of radiant heat; a heating portion 130 fixed to a second surface of the base member 120 and provided therein with a heating element 132, the heating portion generating heat; and a heat insulating material 140 being in close contact with the second surface of the base member 120 and a second surface of the heating portion 130, and blocking heat loss to the second surfaces.

The heating portion 130 may be formed in a rod shape having one or more heating elements 132. Herein, each of the heating elements 132 may be a positive temperature coefficient (PTC) element.

The radiation layer 110 may be ceramic, or an oxide film formed by an anodizing process, and may have a predetermined thickness to have electrical insulation. In addition, when the radiation layer 110 is ceramic, the radiation layer may have a thickness of 200 to 300 μm and when the radiation layer is the oxide film formed by the anodizing process, the radiation layer may have a thickness of several to several tens μm.

Further, a coloring layer 111 may be further formed on the radiation layer 110. Herein, the coloring layer 110 may be formed to have a color of any one of red, white, and black, or a combination color thereof.

The heating portion 130 may include: an insulating support 131 provided therein with a plurality of space portions formed by passing through upper and lower surfaces of the insulating support, the space portions being arranged to be distanced from each other at a predetermined interval; a plurality of heating elements 132 provided in the space portions, respectively; an electrode layer 133 including a first electrode 133a being in close contact with rear surfaces of the heating elements 132, and a second electrode 133b being in close contact with front surfaces of the heating elements 132; an insulating layer 134 including a first insulating layer 134a attached to a rear surface of the first electrode 133a and a second insulating layer 134b attached to a front surface of the second electrode 133b; and a casing 135 made of a material having conductivity and surrounding the insulating support 131, the heating elements 132, the electrode layer 133, and the insulating layer 134. Herein, the base member 120 and the casing 135 may be formed integrally with each other.

Alternatively, the heating portion 130 may include: an insulating support 131 provided therein with a plurality of space portions formed by passing through upper and lower surfaces of the insulating support, the space portions being arranged to be distanced from each other at a predetermined interval; a plurality of heating elements 132 provided in the space portions, respectively; an electrode layer 133 including a first electrode 133a being in close contact with rear surfaces of the heating elements 132; an insulating layer 134 including a first insulating layer 134a attached on a rear surface of the first electrode 133a; and a casing 135 made of a material having conductivity and surrounding the insulating support 131, the heating elements 132, the electrode layer 133, and the insulating layer 134. Herein, the base member 120 and the casing 135 may be formed integrally with each other.

The vehicle radiation heater 100 may further include: a fixing member 121 fixing the heating portion 130 to the base member 120, wherein the fixing member 121 may be a caulking member 121b provided on the second surface of the base member 120 and caulked with the heating portion 130, or may be an adhesive member 121a including a silicone adhesive.

The base member 120 may be provided with a seat portion 122 formed in a shape corresponding to a shape of the heating portion 130 on the second surface of the base member to which the heating portion 130 is fixed, such that the heating portion 130 is closely fixed to the base member.

The vehicle radiation heater 100 may further include: a plurality of heat transfer members 150 interposed between the base member 120 and the heating portion 130, and extending from the heating portion 130.

The heating portion 130 may be formed in a rod shape having one or more heating elements 132. Herein, each of the heating elements 132 may be a positive temperature coefficient (PTC) element.

Each of the heat transfer members 150 may be a heat pipe or a carbon-based material.

The radiation layer 110 may be ceramic, or an oxide film formed by an anodizing process, and may have a predetermined thickness to have electrical insulation.

Further, a vehicle radiation heater 100 includes: a heating portion 130 provided therein with a heating element 132 and generating heat; a plurality of heat transfer members 150 extending from the heating portion 130, and formed in a plate shape, the heat transfer members being provided on first surfaces thereof with a radiation layer 110; and a heat insulating material 140 provided on second surfaces of the heat transfer member 150.

The heating portion 130 may be formed in a rod shape having one or more heating elements 132. Herein, each of the heating elements 132 may be a positive temperature coefficient (PTC) element.

Each of the heat transfer members 150 may be a heat pipe or a carbon-based material.

The radiation layer 110 may be ceramic, or an oxide film formed by an anodizing process, and may have a predetermined thickness to have electrical insulation.

Advantageous Effects

As described above, the vehicle radiation heater of the present invention can be simple in structure, thereby being easy to manufacture, and can quickly emit high-temperature radiant heat over the entire area of the heater, thereby enhancing rapid and comforting heating effects. In addition, the heater can maintain a constant temperature, thereby preventing a risk of overheating.

DESCRIPTION OF DRAWINGS

FIG. 1 is a view showing an example in which a conventional vehicle radiation heater is mounted in a vehicle.

FIG. 2 is a schematic view showing a configuration of the conventional vehicle radiation heater.

FIGS. 3a and 3b are schematic views showing a vehicle radiation heater assembly, which includes a vehicle radiation heater according to the present invention.

FIGS. 12a to 12c are views showing various embodiments of the vehicle radiation heater according to the first embodiment of the present invention.

BEST MODE

Hereinafter, a vehicle radiation heater 100 according to the present invention will be described in detail with reference to the accompanying drawings.

Figure 3A:
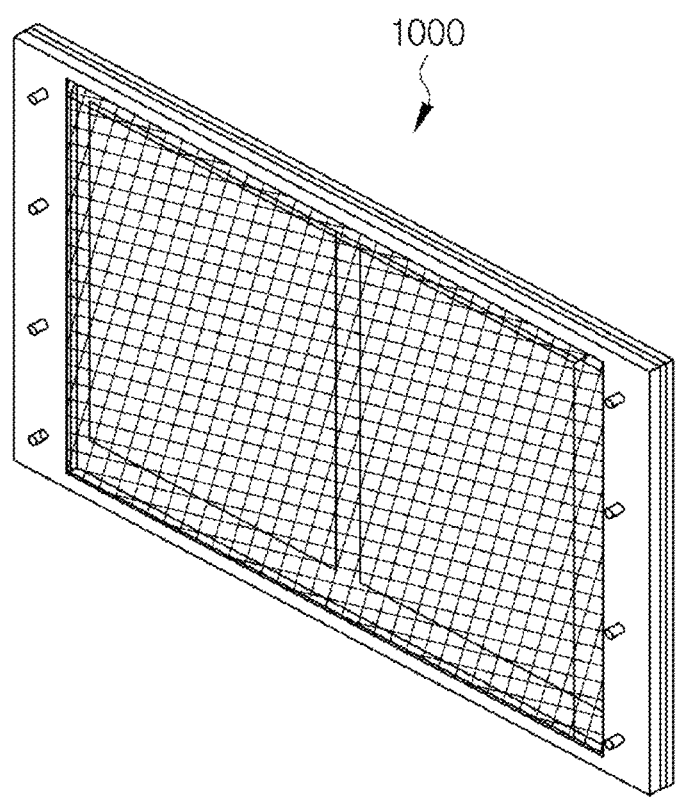
Figure 4A:
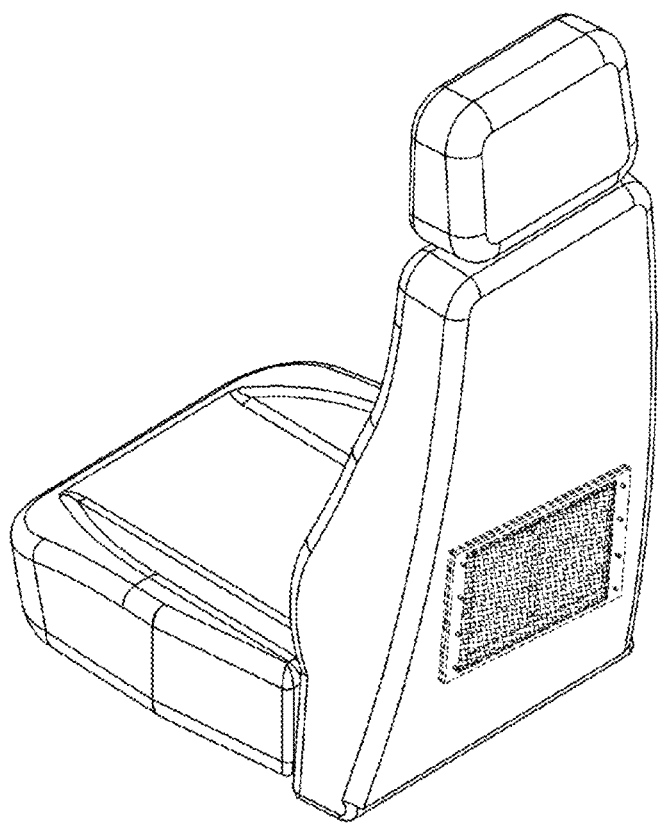
FIGS. 4a and 4b are views showing installation examples of the vehicle radiation heater assembly according to the present invention.
Figure 4B:
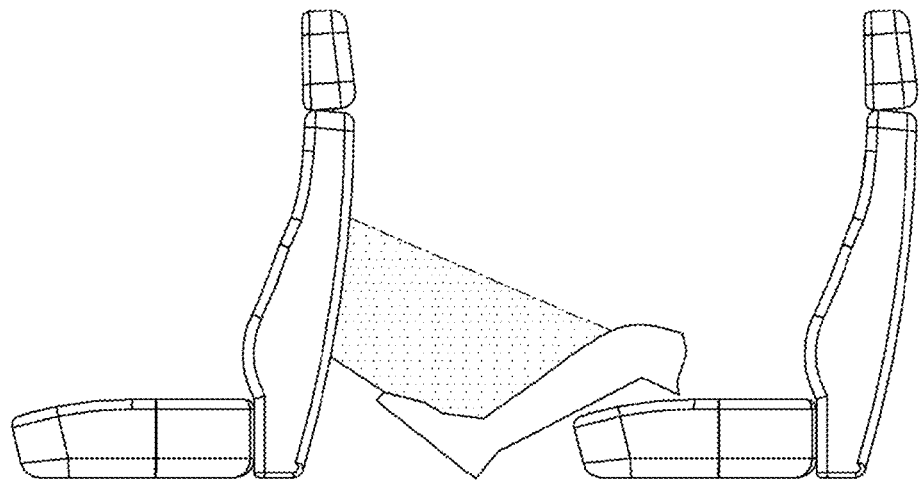

FIGS. 3a and 3b are a perspective view and an exploded perspective view showing a vehicle radiation heater assembly 1000, which includes the vehicle radiation heater 100 according to the present invention, respectively. Further, FIGS. 4a and 4b are views showing installation examples of the vehicle radiation heater assembly 1000 according to the present invention.

As shown in the drawings, the vehicle radiation heater 100 of the present invention constitutes the vehicle radiation heater assembly 1000 and is mounted in a vehicle. In addition, the vehicle radiation heater 100 for the vehicle is a device that generates heat when electric power is applied thereto, and is provided to solve the problem that the heater cannot perform heating properly due to cooling water that is insufficiently heated in winter at the early stage when a passenger rides in the vehicle. Herein, the vehicle radiation heater assembly 1000 may be mounted on the rear surface of a front seat and generate heat toward a passenger on the back seat. However, the installation position thereof can be varied in accordance with user's desires at any time.

The vehicle radiation heater assembly 1000 according to the present invention may be configured such that a front cover 400, a safety mesh 300, the vehicle radiation heater 100, and a back cover 200 are stacked on top of each other in a sequence, wherein the front cover 400 and the back cover 200 are combined such that the safety mesh 300 and the vehicle radiation heater 100 are fixed. Herein, the front cover 400 may be formed in a frame shape such that the edge of the safety mesh 300 is fixed thereto, and a plurality of coupling holes may be formed in the front cover 400 so that fixing pins protruding on the back cover 200 are inserted and coupled to the coupling holes of the front cover 400. Further, the safety mesh 300 may be formed in a net shape such that radiant heat generated from the vehicle radiation heater 100 is emitted forwards (to a direction of passengers), and the edge of the safety mesh may be fixed between the front cover 400 and the back cover 200.

Embodiment 1

Figure 5:
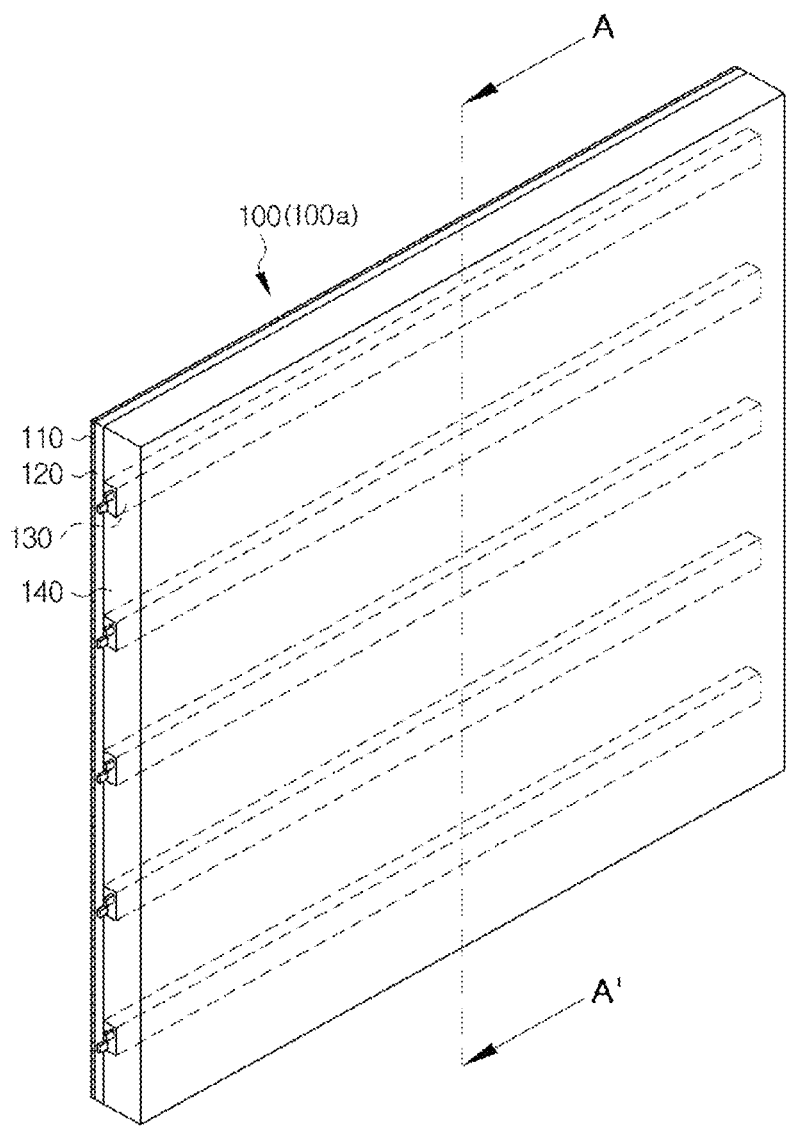
FIG. 5 is a perspective view showing a vehicle radiation heater according to a first embodiment of the present invention.
Figure 6:
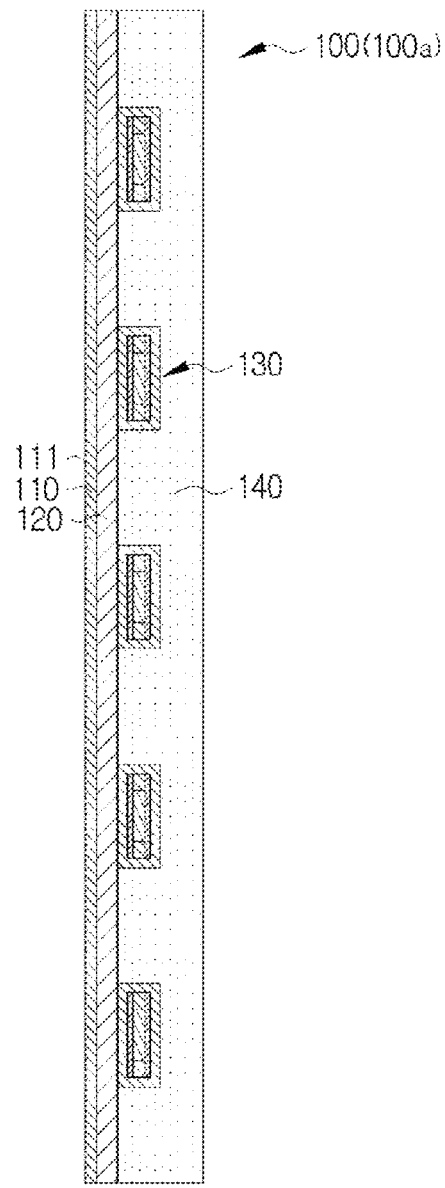
FIG. 6 is a cross-sectional view taken along line A-A' of FIG. 5.

FIG. 5 is a perspective view showing a vehicle radiation heater 100a according to a first embodiment of the present invention, and FIG. 6 is a cross-sectional view taken along line A-A' of FIG. 5. As shown in the drawings, the vehicle radiation heater 100a according to the first embodiment of the present invention includes a base member 120, a heating portion 130, and a heat insulating material 140.

The base member 120, which constitutes a heating surface, is made of a material having thermal conductivity, such as aluminum, and may be formed in a plate shape having a predetermined thickness. In addition, a radiation layer 110 is provided on a first surface of the base member 120 such that radiant heat emission performance is enhanced.

In general, the heating portion 130 may be a heat source connected to a power source of a vehicle and generating heat using electricity, but may be implemented in various other ways. The heating portion 130 is fixed to a second surface of the base member 120, and generates heat when a heating element 132 provided therein is supplied with electric power. In addition, the heating portion 130 may have an elongated rod shape having a rectangular cross section, and a plurality of heating portions 130 may be arranged at a regular interval in the height direction of the base member 120 (A-A' line direction of FIG. 5). When the base member 120 receives heat from the heating portion 130 fixed to the second surface thereof, the base member emits the heat from the first surface thereof.

The heat insulating material 140 is provided to be in close contact with the second surface of the base member 120 where the radiation layer 110 is absent, and with a second surface of the heating portion 130, and serves to prevent heat loss to a second surface of the vehicle radiation heater 100a, and to prevent damage to the peripheral portions due to heat generation operation of the vehicle radiation heater 100a. The heat insulating material 140 may use a foamed silicone, an inorganic heat insulating material 140, etc., and may use any material capable of blocking heat without being limited thereto.

In the vehicle radiation heater 100a having the above-described structure, when the heating portion 130 generates heat, radiant heat is emitted from the first surface of the base member 120. Herein, the base member 120 is provided with the radiation layer 110 whereby radiant heat emission performance can be maximized. Specifically, in the case that the radiation layer 110 is absent, on the basis of the amount of heat generated from the heating portion 130, only about 40 to 50% of the actual amount of radiant heat having been emitted from a first surface of the vehicle radiation heater 100a is delivered to a passenger. However, when the radiation layer 110 is provided, the performance can be improved to about 80 to 90% even when heat loss to the second surface of the vehicle radiation heater 100 and heat loss due to conduction or convection are taken into consideration. In other words, by forming the radiation layer 110 on the first surface of the base member 120, efficiency of radiation heat emission can be maximized. Accordingly, rapid heating can be achieved, thereby providing comforting heating to the passenger.

Herein, the radiation layer 110 may be separately formed and attached to the base member 120, or may be coated on the first surface of the base member 120. The radiation layer 110 formed as described above may be ceramic or may be an oxide film formed by an anodizing process, and may have a predetermined thickness to have electrical insulation. Specifically, in the case that the radiation layer 110 is ceramic, the radiation layer may have a thickness of 200 to 300 μm. In the case that the radiation layer 110 is the oxide film formed by the anodizing process, the radiation layer may have a thickness of several to several tens μm. However, the thickness of the radiation layer 110 is not limited to the above-mentioned range, and it may be formed to have an appropriate thickness sufficient to exert a predetermined performance of radiant heat emission while having electrical insulation.

In addition, the radiation layer 110 may be formed to have a black or white color to maximize radiant heat emission, and a color of the radiation layer may be formed by adding a dye upon the surface treatment or coating. Moreover, the radiation layer may be formed by various anodizing treatments, coloring, painting, application, etc. Specifically, the vehicle radiation heater 100a further includes a coloring layer 111 formed on the radiation layer 110, so that aesthetic impression in terms of design can be achieved as well as heating performance. The coloring layer 111 may be formed by painting a first surface of the radiation layer 110 with a specific color after forming the radiation layer 110 on the base member 120. Alternatively, the coloring layer 111 may be formed by simultaneously forming and coloring the radiation layer 110 by the anodizing process. Herein, the anodizing process is performed such that the radiation layer 110 is formed by masking the second surface of the base member 120 and then electrically oxidizing it in an electrolyte solution. At this time, by using an electrolyte solution containing a coloring material, forming and coloring of the radiation layer 110 are simultaneously performed. In the case that the anodizing process is applied as described above, easy and convenient coloring can be achieved. The coloring layer 111 can be formed to have a desired color. However, in the case of any one of red, white, and black, or a combination thereof, it is more advantageous in terms of efficiency of radiant heat emission.

Figure 7:
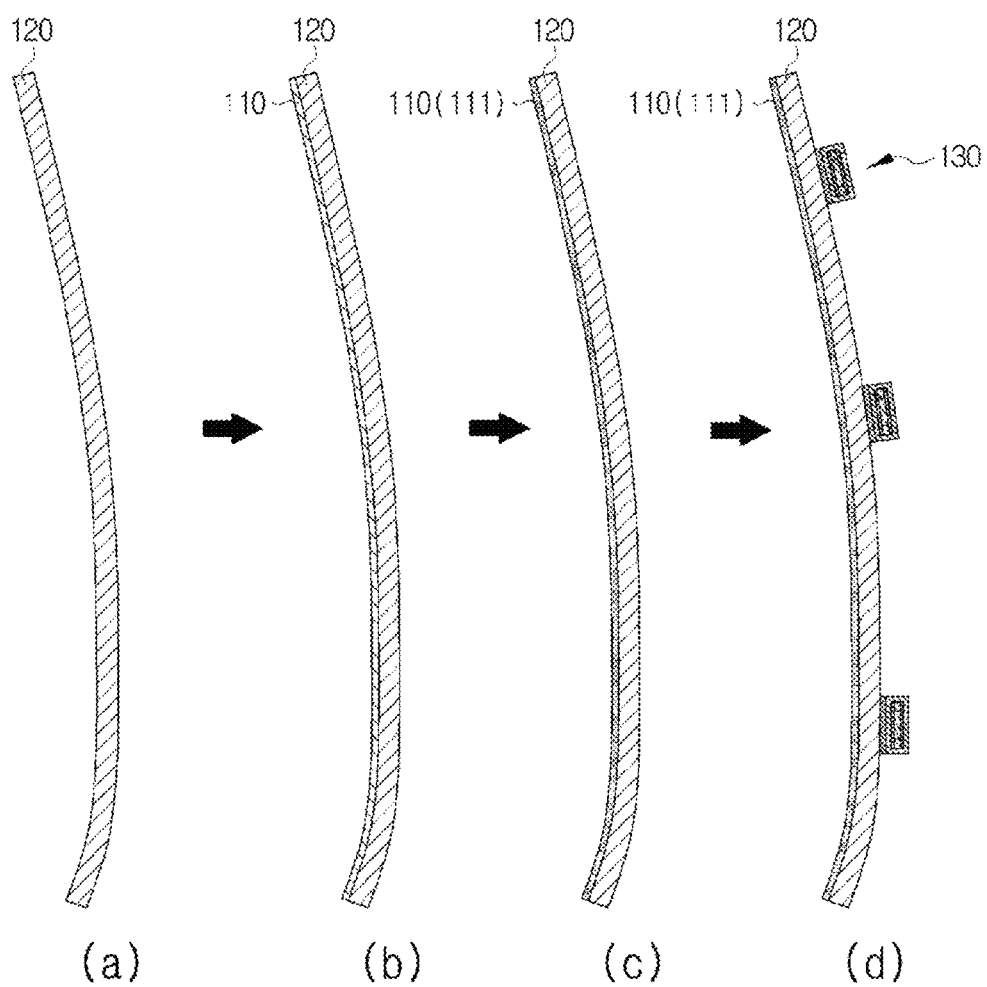
FIGS. 7, 8a, 8b, 9a, 9b and 10 are views showing various embodiments of a manufacturing process of the vehicle radiation heater according to the first embodiment of the present invention.

FIG. 7 is a view showing a manufacturing process of the vehicle radiation heater 100a according to the first embodiment of the present invention. First, as shown in FIG. 7a, the base member 120 prepared may be formed in a shape corresponding to a shape of a mounting position by a die casting or drawing process. Thereafter, the radiation layer 110 is formed as ceramic or as the oxide film by the anodizing process (FIG. 7b), and the coloring layer 111 may be further formed on the radiation layer 110 (FIG. 7c). Then, the plurality of heating portions 130 are attached to the second surface of the base member 120 to be distanced from each other (FIG. 7d), and finally, the heat insulating material 140 is stacked as shown in FIG. 6, whereby manufacture of the vehicle radiation heater 100a is completed.

Figure 8A:
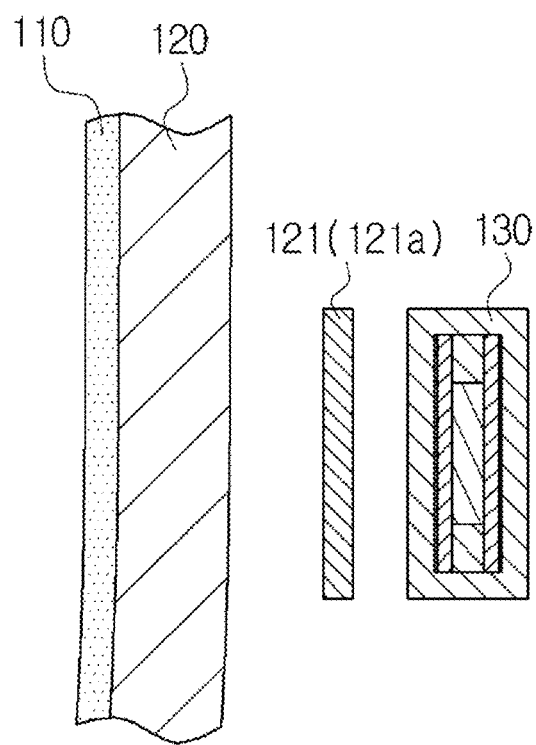
Figure 8B:
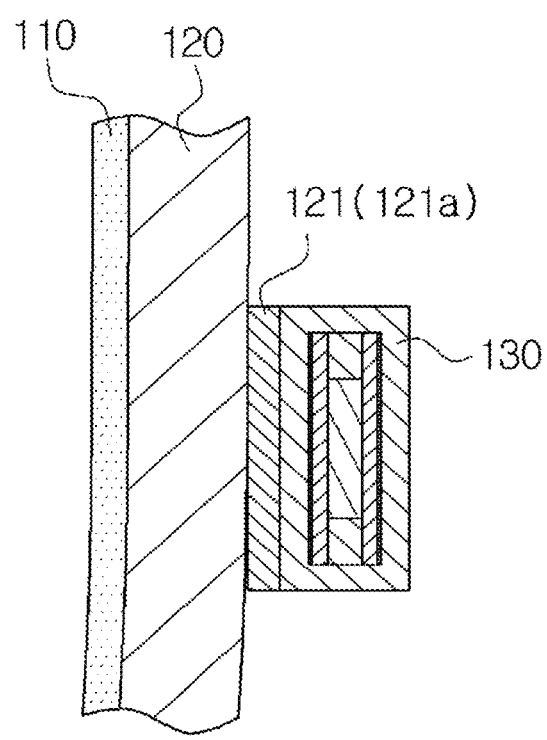
Figure 9A:
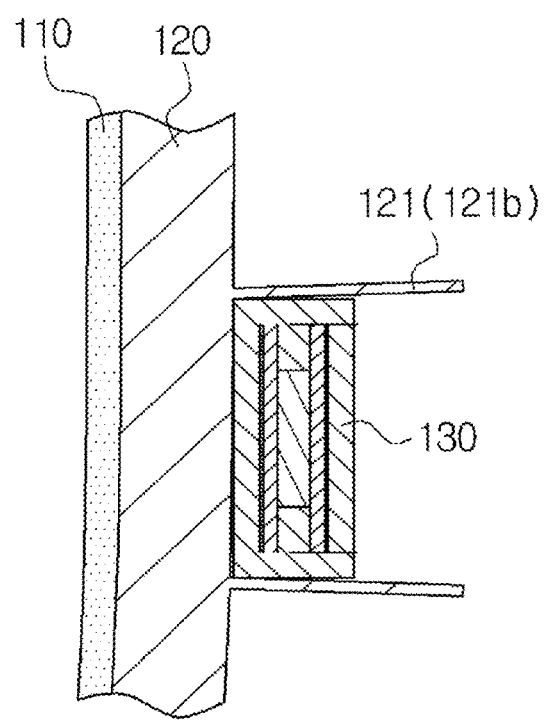
Figure 9B:
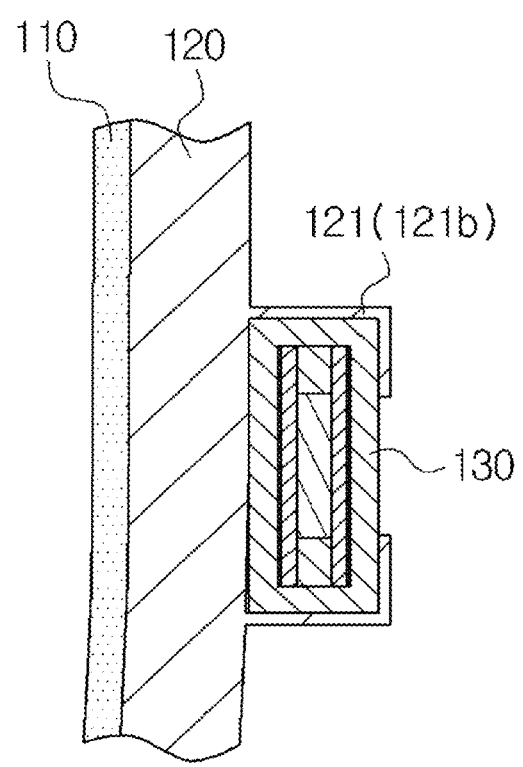

Herein, the vehicle radiation heater 100a may further include a fixing member 121 for fixing the heating portions 130 to the base member 120. Specifically, as shown in FIGS. 8a and 8b, the heating portion 130 can be easily attached to the base member 120 by using an adhesive member 121a such as a silicone adhesive. Alternatively, a caulking member 121b may be formed on the second surface of the base member 120 when the base member 120 is formed, such that as shown in FIGS. 9a and 9b, the heating portion 130 is caulked to the caulking member 121b.

Herein, the heating portion 130 may be firmly fixed to the base member 120 such that the heating portion 130 is in complete contact with the base member 120. In the case that the caulking member 121b is used as the fixing member 121, excellent durability can be ensured compared to the adhesive member 121a which may be deteriorated in adhesion due to long-term heating of the vehicle radiation heater 100a, and also excellent thermal conductivity can be ensured from the heating portion 130 to the base member 120.

Figure 10:
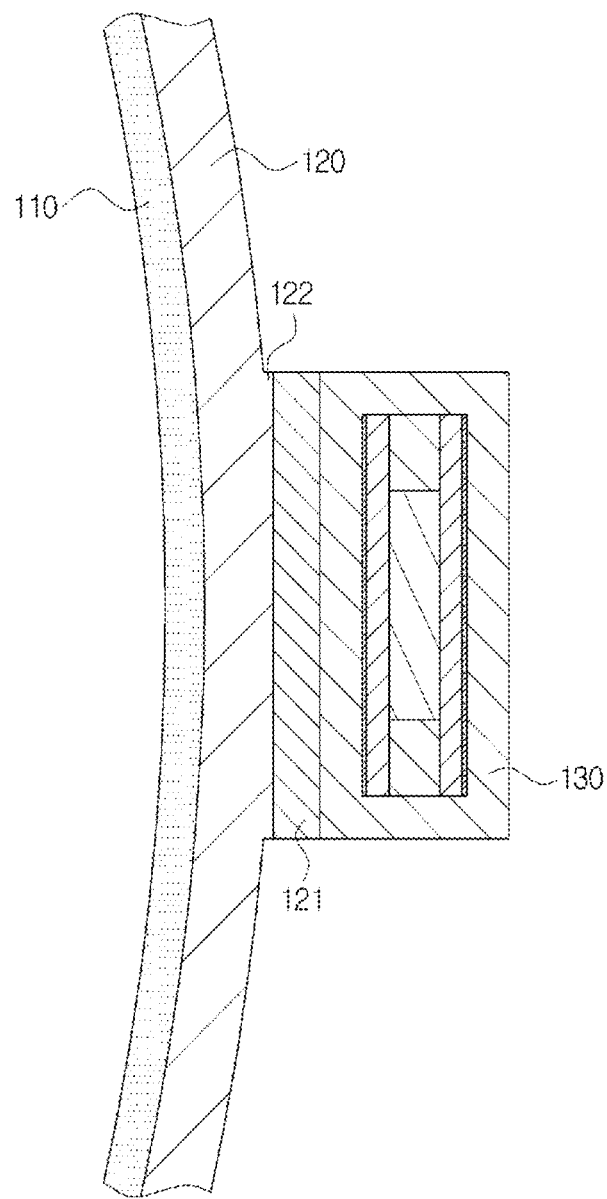

Meanwhile, FIG. 10 is a view showing a state in which a seat portion 122 is formed on the base member 120 and the heating portion 130 is seated on the seat portion 122. In order to improve thermal conductivity from the heating portion 130 to the base member 120, the heating portion 130 and the base member 120 may be in close contact with each other.

However, since the heating portion 130 according to the first embodiment of the present invention is formed in an elongated rod shape having a rectangular cross section, the surface of the heating portion 130 where the heating portion is in contact with the base member 120 is a flat surface whereas the surface of the base member 120 where the base member is in contact with the heating portion may be a curved surface as shown in FIG. 7a. In this case, since the heating portion 130 is not in completely close contact with the base member 120, a gap may be inevitably defined between the heating portion 130 and the base member 120, thereby deteriorating efficiency of radiant heat emission.

In order to solve this problem, the vehicle radiation heater 100a according to the first embodiment of the present invention may be configured such that when the base member 120 is formed, the seat portion 122 may be formed on the second surface of the base member to which the heating portion 130 is fixed in a shape corresponding to a shape of the heating portion 130. In other words, even when the overall shape of the base member 120 is formed to have the curved surface, the curved surface may be partially flat only at a position where the heating portion 130 is attached to the base member 120 such that the heating portion 130 is closely fixed to the base member 120.

Figure 11:
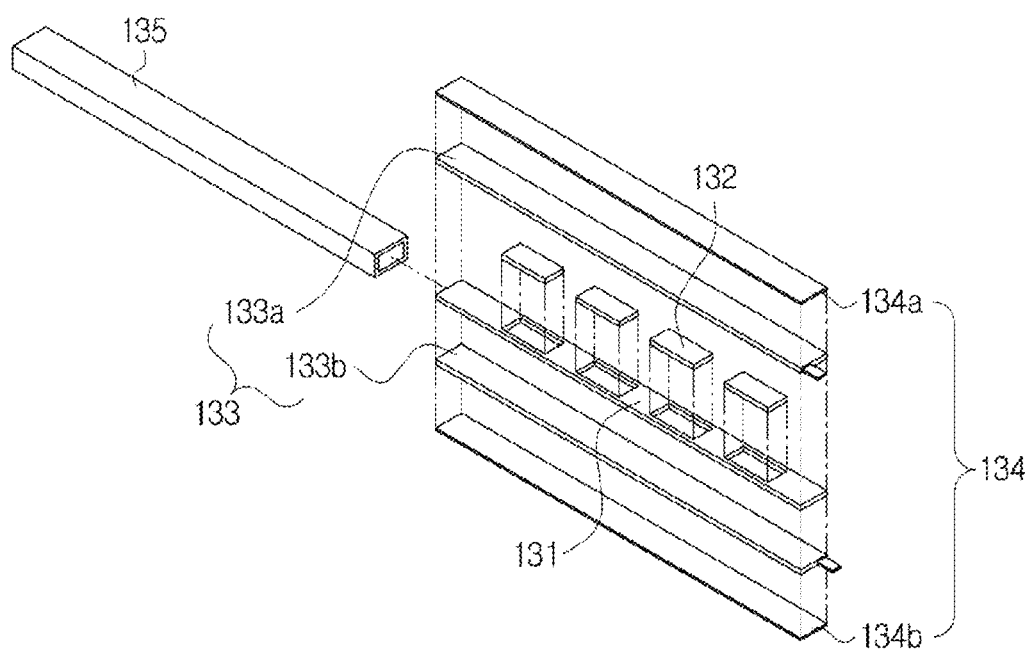
FIG. 11 is an exploded perspective view showing a heating portion constituting the vehicle radiation heater according to the first embodiment of the present invention.

Hereinafter, the heating portion 130 of the vehicle radiation heater 100a according to the first embodiment of the present invention will be described in detail. FIG. 11 is an exploded perspective view showing the heating portion 130 constituting the vehicle radiation heater 100a according to the first embodiment of the present invention.

As shown in the drawing, the heating portion 130 includes: an insulating support 131 provided therein with a plurality of space portions formed by passing through upper and lower surfaces of the insulating support and arranged to be distanced from each other at a predetermined interval; a plurality of heating elements 132 provided in the space portions, respectively; an electrode layer 133 including a first electrode 133a being in close contact with rear surfaces of the heating elements 132 and a second electrode 133b being in close contact with front surfaces of the heating elements 132; an insulating layer 134 including a first insulating layer 134a attached to a rear surface of the first electrode 133a and a second insulating layer 134b attached to a front surface of the second electrode 133b; and a casing 135 made of a material having conductivity and surrounding the insulating support 131, the heating elements 132, the electrode layer 133, and the insulating layer 134.

The heating portion 130 having such a structure may have an elongated rod shape as shown in FIG. 5, and the plurality of heating portions 130 may be fixed to the base member 120 and arranged on the base member to be distanced from each other at a predetermined interval, thereby constituting the vehicle radiation heater 100a. Thus, the vehicle radiation heater 100a according to the present invention can rapidly emit high-temperature radiant heat over the entire area of the base member 120, thereby enhancing rapid and comfort heating effects, and achieving a simple structure and thus being easy to manufacture.

The heating portion 130 generates heat by being applied with positive and negative voltages to upper and lower surfaces of the heating elements 132 through the first electrode 133a and the second electrode 133b, respectively.

In general, the resistance tends not to vary with temperature. However, a positive temperature coefficient (PTC) element has a characteristic in which the resistance rapidly increases when the temperature increases and then reaches a predetermined temperature. In other words, when the temperature increases equal to or greater than a predetermined level, the resistance increases, and when the resistance increases, the amount of current capable of flowing decreases. In addition, there is a circulation characteristic in which when the amount of current decreases, the amount of heat decreases and the temperature decreases again, and when the temperature decreases, the resistance increases again and then heating starts.

In the case that a PTC element having such characteristics is used as the heating elements 132, there is a constant temperature characteristic in which the temperature of the heater is fixed at a Curie point of the heating elements 132, whereby temperature control is possible at a predetermined temperature. Herein, the Curie point denotes a point that changes in property when exceeding a critical temperature. Accordingly, even when the temperature of the heater is maintained at a high temperature of equal to or greater than 100 to about 200 degrees, it is possible to secure durability, and there is no risk of overheating due to the constant temperature characteristic whereby it is possible to prevent possibility of fire.

Figure 12A:
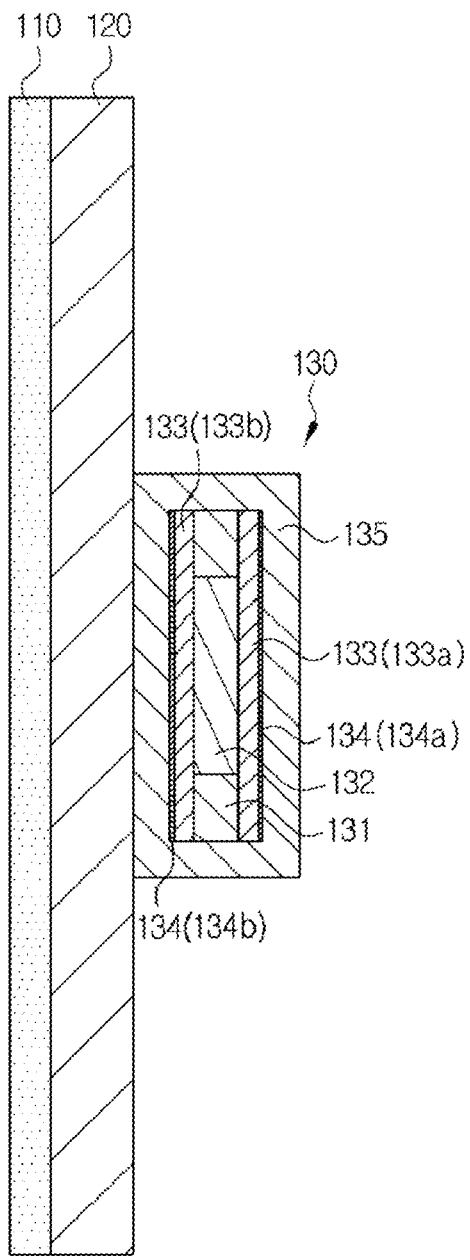
Figure 12C:
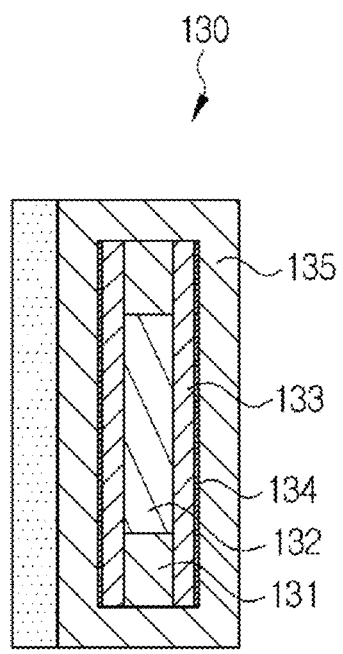

FIGS. 12a to 12c are schematic views showing various embodiments of the vehicle radiation heater 100a according to the first embodiment of the present invention.

The heating portion 130 shown in FIG. 12a has a structure including the insulating support 131, the heating elements 132, the first electrode 133a, the second electrode 133b, the first insulating layer 134a, the second insulating layer 134b, and the casing 135, and is attached to the second surface of the base member 120 having the radiation layer 110 formed on the first surface of the base member (fixing member is omitted), which remains the same as the structure shown in FIG. 11.

On the other hand, the heating portion 130 shown in FIG. 12b has a structure surrounded by the casing 135 in the state in which the second electrode 133b and the second insulating layer 134b are omitted in the structure of FIG. 12a. This is a structure in which the second electrode 133b and the second insulating layer 134b are absent as the casing 135 and the base member 120 have conductivity. For example, when the first electrode 133a is a positive terminal, the casing 135 or the base member 120 serves as a negative terminal. As such, the surfaces of the heating elements 132, which are adjacent to the base member 120, do not need to be provided with the electrode layer 133 and the insulating layer 134, whereby the heating portion 130 can be simplified in structure and thus can be easy to manufacture while maintaining heating performance.

Further, FIG. 12c shows a structure in which the base member 120 and the casing 135 are formed integrally with each other. In other words, since the casing 135 of the heating portion 130 may also serve as the base member 120, the radiation layer 110 may be formed on a first surface of the heating portion 130 without provision of the base member 120 to constitute the vehicle radiation heater 100a according to the first embodiment.

Embodiment 2

Figure 13:
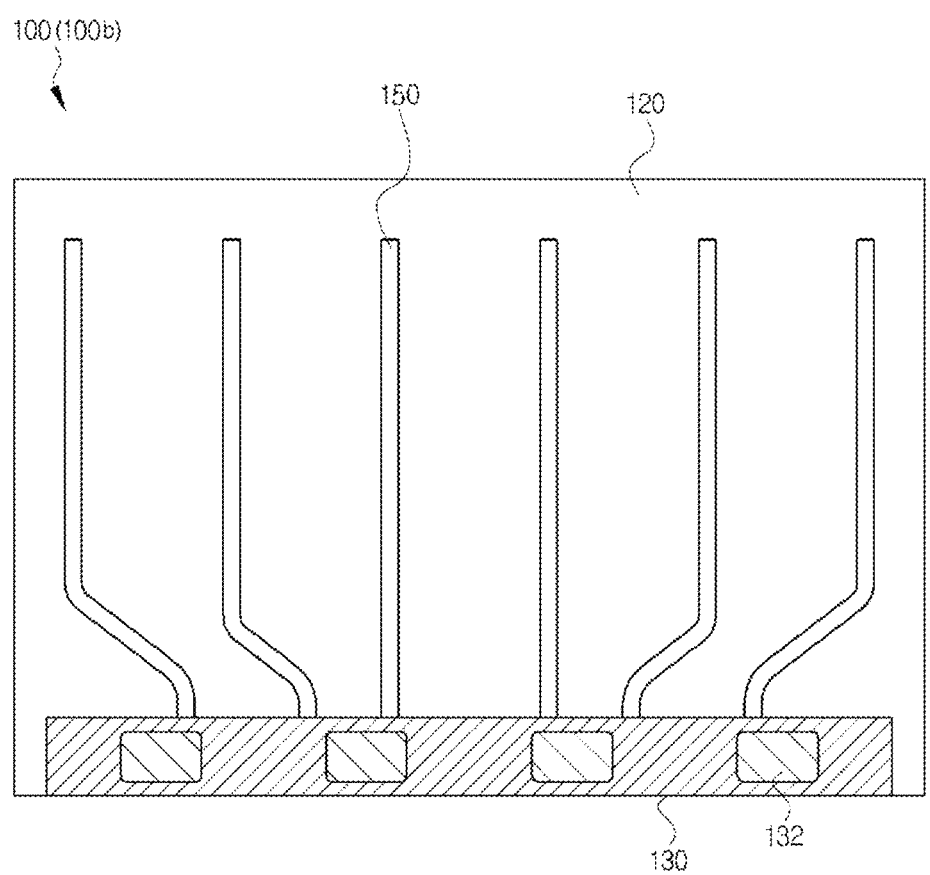
FIG. 13 is a front view showing a vehicle radiation heater according to a second embodiment of the present invention.
Figure 14:
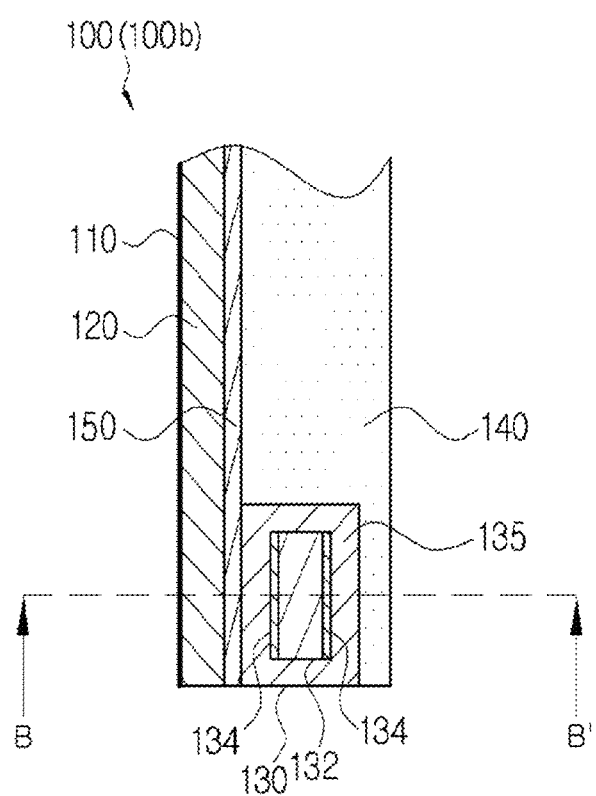
FIG. 14 is a cross sectional side view of FIG. 13.
Figure 15:
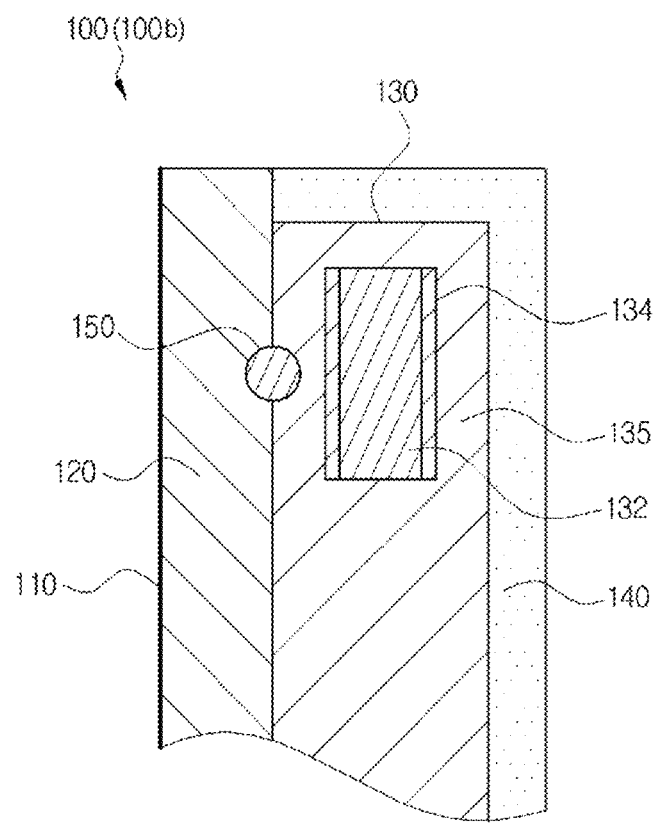
FIG. 15 is a cross sectional view taken along line B-B' of FIG. 14.

FIG. 13 is a front view showing a vehicle radiation heater 100b according to a second embodiment of the present invention, FIG. 14 is a cross sectional side view of FIG. 13, and FIG. 15 is a cross sectional view taken along line B-B' of FIG. 14. As shown in the drawings, the vehicle radiation heater 100b according to the second embodiment of the present invention includes a base member 120, a heating portion 130, and a heat insulating material 140, and further includes a plurality of heat transfer members 150 interposed between the base member 120 and the heating portion 130 and extending from the heating portion 130.

The base member 120, which constitutes a heating surface, is made of a material having thermal conductivity, such as aluminum and may be formed in a plate shape having a predetermined thickness. In addition, a radiation layer 110 is provided on a first surface of the base member 120 such that radiant heat emission performance is enhanced.

In general, the heating portion 130 may be a heat source connected to a power source of a vehicle and generating heat using electricity, but may be implemented in various other ways. The heating portion 130 is fixed to a second surface of the base member 120, and generates heat when a heating element 132 provided therein is supplied with electric power. When the base member 120 receives heat from the heating portion 130 fixed to the second surface thereof, the base member emits the heat from the first surface thereof.

The heat insulating material 140 is provided to be in close contact with both the second surface of the base member 120 where the radiation layer 110 is absent and a second surface of the heating portion 130, and serves to prevent heat loss to a second surface of the vehicle radiation heater 100b, and to prevent damage to the peripheral portions due to heat generation operation of the vehicle radiation heater 100b. The heat insulating material 140 may use a foamed silicone, an inorganic heat insulating material 140, etc., and may use any material capable of blocking heat without being limited thereto.

In the vehicle radiation heater 100b having the above-described structure, radiant heat is emitted from to the first surface of the base member 120 when the heating portion 130 generates heat. Herein, the base member 120 is provided with the radiation layer 110 whereby radiant heat emission performance can be maximized. Specifically, in the case that the radiation layer 110 is absent, on the basis of the amount of heat generated from the heating portion 130, only about 40 to 50% of the actual amount of radiant heat that having been emitted from a first surface of the vehicle radiation heater 100b is delivered to a passenger. However, when the radiation layer 110 is provided, the performance can be improved to about 80 to 90% even when heat loss to the second surface of the vehicle radiation heater 100 and heat loss due to conduction or convection are taken into consideration. In other words, by forming the radiation layer 110 on the first surface of the base member 120, efficiency of radiation heat emission can be maximized. Accordingly, rapid heating can be achieved, thereby providing comfort heating to the passenger.

Herein, the radiation layer 110 may be separately formed and attached to the base member 120, or may be coated on the first surface of the base member 120. The radiation layer 110 formed as described above may be ceramic or may be an oxide film formed by an anodizing process, and may have a predetermined thickness to have electrical insulation. Specifically, in the case that the radiation layer 110 is ceramic, the radiation layer may have a thickness of 200 to 300 µm. In the case that the radiation layer 110 is the oxide film formed by the anodizing process, the radiation layer may have a thickness of several to several tens µm. However, the thickness of the radiation layer 110 is not limited to the above-mentioned range, and it may be formed to have an appropriate thickness sufficient to exert a predetermined performance of radiant heat emission while having electrical insulation.

In addition, the radiation layer 110 may be formed to have a black or white color to maximize radiant heat emission, and a color of the radiation layer may be formed by adding a dye upon the surface treatment or coating. Moreover, the radiation layer may be formed by various anodizing treatments, coloring, painting, application, etc. Specifically, the vehicle radiation heater 100b further includes a coloring layer 111 formed on the radiation layer 110, so that aesthetic can impression in terms of design can be achieved as well as heating performance. The coloring layer 111 may be formed by painting a first surface of the radiation layer 110 with a specific color after forming the radiation layer 110 on the base member 120. Alternatively, the coloring layer 111 may be formed by simultaneously forming and coloring the radiation layer 110 by the anodizing process. Herein, the anodizing process is performed such that the radiation layer 110 is formed by masking the second surface of the base member 120 and then electrically oxidizing it in an electrolyte solution. At this time, by using an electrolyte solution containing a coloring material, forming and coloring of the radiation layer 110 are simultaneously performed. In the case that the anodizing process is applied as described above, easy and convenient coloring can be achieved. The coloring layer 111 can be formed to have a desired color. However, in the case of any one of red, white, and black, or a combination thereof, it is more advantageous in terms of efficiency of radiant heat emission.

Meanwhile, the heat transfer members 150 serve to transfer heat generated in the heating portion 130, which is a heat source, to the base member 120, and may be made of a material having a high heat transfer coefficient. The plurality of heat transfer members 150 may be provided, the heat transfer members are closely coupled with the heating portion 130, and may extend from the heating portion 130. In other words, as shown in the drawings, the heat transfer members 150 may be configured such that first sides are coupled with the heating portion 130 and second sides extend away from the heating portion 130, wherein the heat transfer members 150 may be arranged on one plane. In addition, the heat transfer members 150 may be formed in various shapes such as a shape extending toward opposite sides or a shape extending radially with respect to the heating portion 130.

The base member 120 transfers heat transferred through the heat transfer members 150 such that the heat spreads evenly over a large area, and allows the transferred heat to be emitted from a front surface (passenger side), which is the first surface, by radiation. The radiation layer 110 is formed on the first surface of the base member 120 to maximize radiant heat emission, and the second surface of the base member 120 is closely coupled with first surfaces of the heat transfer members 150.

The heat insulating material 140 serves to block heat from being transferred rearwards to a direction of the seat of a vehicle and may be provided on the second surface of the base member 120. For example, as shown in the drawings, the heat insulating material 140 entirely covers the second surface of the base member 120, the second surface of the heating portion 130, and second surfaces of the heat transfer members 150, thereby blocking heat from being transferred or radiated rearwards. Herein, the heat insulating material 140 may cover the circumferential surface of the base member 120 in the width direction of the base member such that heat is blocked from being transferred or radiated in directions other than the forward direction. Thus, the vehicle radiation heater 100b of the present invention can rapidly radiate high-temperature radiant heat over the entire area of the heat radiation plate, thereby enhancing rapid and comforting heating effects, and can be simple in structure, thereby being easy to manufacture.

The base member 120 may be formed by die casting, drawing, etc. Further, the base member 120 may be provided with grooves at positions where the base member and the heat transfer members 150 are closely coupled with each other such that the heat transfer members 150 are partially placed in the grooves, respectively. Accordingly, heat transfer between the heat transfer members 150 and the base member 120 can be facilitated. In addition, the heating portion 130 may be provided with grooves such that the heat transfer members 150 are partially placed in the grooves, respectively. Accordingly, the heating portion 130 and the base member 120 are closely coupled with each other whereby heat transfer therebetween can be facilitated. Further, the heating portion 130 and the heat transfer members 150, the heat transfer members 150 and the base member 120, the heating portion 130 and the base member 120 are attached to each other, respectively, by using an adhesive such as silicone, etc., may be closely coupled with each other, respectively, by a fastening means or a fixing member, or may be closely coupled with each other, respectively, such that the heat transfer members 150 are inserted into the grooves, respectively. Furthermore, a thermal grease or the like may be applied to a portion where the heating portion 130, the base member 120, and the heat transfer members 150 are in contact with each other to improve thermal conductivity.

The heating portion 130 is provided with one or more heating elements 132, and may be formed in a rod shape. In other words, since the base member 120 may have a large area, the plurality of heating elements 132 may be arranged to be distanced from each other in the heating portion 130 to form a row, whereby the heating portion 130 may be formed in a rod shape. In addition, the heating portion 130 may be formed such that one or more heating elements 132 are inserted into and arranged in the casing 135 formed in a tube shape. Herein, the insulating layer 134 may be interposed between the heating elements 132 and the casing 135 such that opposite surfaces of the respective heating elements 132 are electrically insulated. Moreover, one heating element 132 may be provided in the heating portion 130 to have an elongated shape.

Further, the heating elements 132 may be a PTC element. As described above, when the PTC element reaches a Curie temperature, the PTC element can maintain the temperature at any time due to the characteristics of the material, so that the PTC element may not be heated equal to or greater than a certain temperature. Accordingly, in the case that the PTC element is used as the heating elements 132, there is an advantage that there is no risk of fire attributable to overheating.

Further, the heat transfer members 150 may be made of a material having a high heat transfer coefficient such as a heat pipe or a carbon-based material (e.g., carbon nanotube). Herein, a heat transfer coefficient of the heat transfer members 150 may be equal to or greater than 500 W/m·K. In the case that the heat transfer members 150 are made of the heat pipe, a flat type heat pipe in the form of a flat plate may be used.

In addition, the heat transfer members 150 may be provided by extending vertically from the heating portion 130, which elongates in a rod shape, and the plurality of heat transfer members 150 may be arranged to be distanced from each other in parallel. Moreover, when viewed in a plane, the first sides of the heat transfer members 150, which are in close contact with the heating portion 130, may be placed at positions where sides of the heat transfer members overlap or are in contact with the heating elements 132 such that the heating elements 132 are adjacent to the heat transfer members 150, whereby heat transfer can be facilitated. Further, the heat transfer members 150 may be formed in a curved shape.

Embodiment 3

Figure 16:
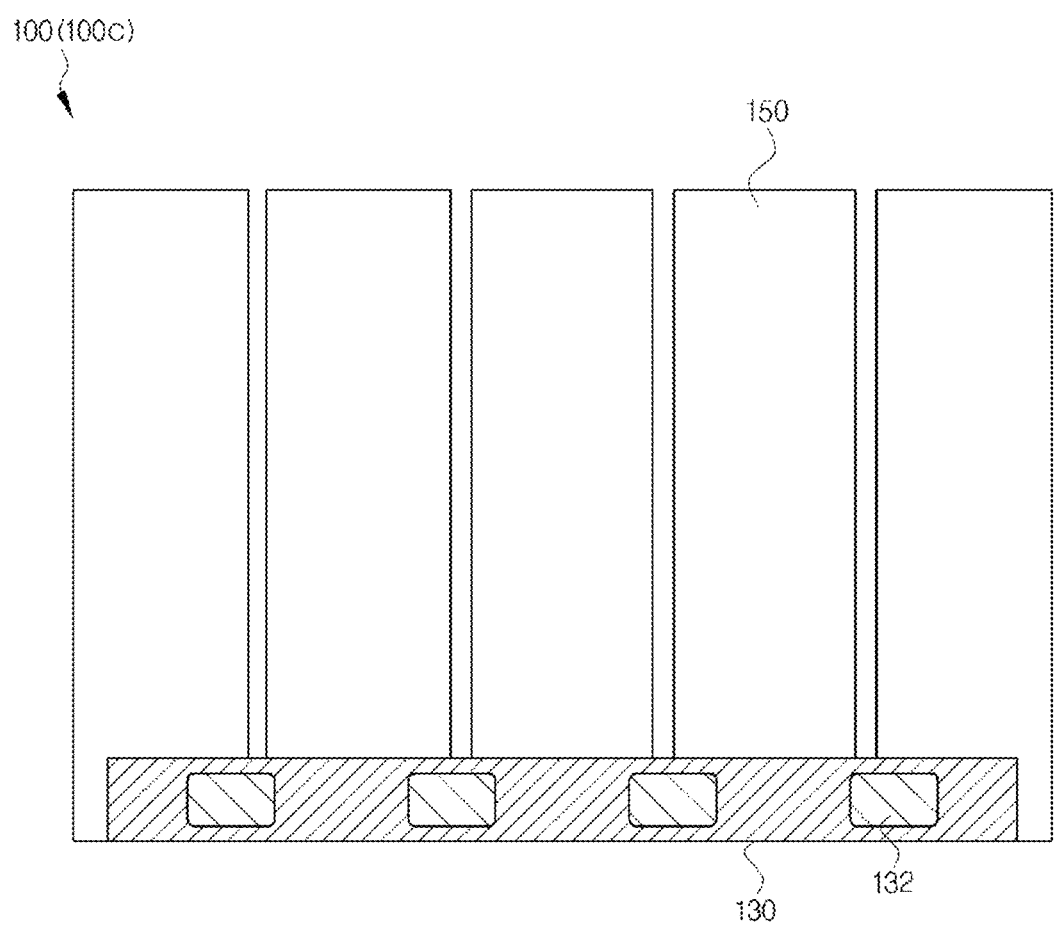
FIG. 16 is a front view showing a vehicle radiation heater according to a third embodiment of the present invention.
Figure 17:
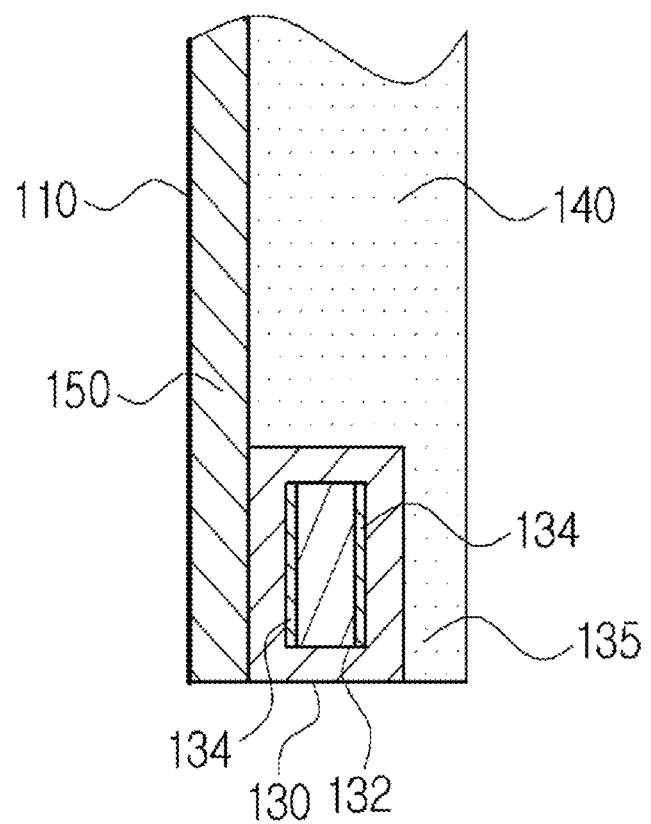
FIG. 17 is a cross sectional side view of FIG. 16.

FIG. 16 is a front view showing a vehicle radiation heater according to a third embodiment of the present invention, and FIG. 17 is a cross sectional side view of FIG. 16.

As shown in the drawings, the vehicle radiation heater 100c according to the third embodiment of the present invention may include: a heating portion 130 provided therein with a heating element 132 and generating heat; a plurality of heat transfer members 150 extending from the heating portion 130 and formed in a plate shape, the heat transfer members being provided at first surfaces thereof with a radiation layer 110 emitting radiant heat; and a heat insulating material 140 provided on second surfaces of the heat transfer members 150.

The vehicle radiation heater 100c according to the third embodiment of the present invention is configured such that the base member 120 is omitted in the Embodiment 2, wherein the heat transfer members 150 are formed in a plate shape and the radiation layer 110 is formed on the first surfaces of the heat transfer members 150 such that the heat transfer members 150 itself directly radiate heat to the outside, which differs from the second embodiment.

The heating portion 130 may be formed in the same manner as the heating portion 130 of Embodiment 2, wherein since the heat transfer members 150 are formed in a plate shape, the heating portion 130 and the heat transfer members 150 can be in close contact with each other on flat surfaces thereof, whereby heat transfer and coupling therebetween can be facilitated.

The heat transfer members 150 may be made of a material having high heat conductivity and high heat transfer coefficient. In addition, the plurality of heat transfer members 150 may be provided, the heat transfer members are closely coupled with the heating portion 130, and may extend from the heating portion 130. The radiation layer 110 may be formed variously according to the type or material of the heat transfer members 150, and the heat insulating material 140 may be provided on the second surfaces the heat transfer members 150 to entirely cover the second surfaces of the heat transfer members 150 and a second surface of the heating portion 130, thereby blocking heat from being transferred or radiated rearwards. As described above, since the heat transfer members 150 are formed in a plate shape and the radiation layer 110 is formed on the heat transfer members, it is possible to achieve a very simple structure and to facilitate coupling between the components. In addition, efficiency of radiant heat emission can be maximized, whereby it is possible to provide a rapid heating effect, thereby providing a comforting heating effect to a passenger.

The heating portion 130 and the heat transfer members 150 are attached to each other by using an adhesive such as silicone, etc., or may be closely coupled with each other by a fastening means or a fixing member. In addition, a thermal grease or the like may be applied to a portion where the heating portion 130 and the heat transfer members 150 are in contact with each other to improve thermal conductivity.

The heating portion 130 may be formed in a rod shape having one or more heating elements 132, wherein the heating elements 132 may be a PTC element.

Herein, the radiation layer 110 may be separately formed and attached to the heat transfer members 150, or may be coated on the first surfaces of the heat transfer members 150. Herein, the radiation layer 110 may be ceramic or may be an oxide film formed by an anodizing process, and may have a predetermined thickness to have electrical insulation. In addition, the radiation layer 110 may be formed to have a black or white color to maximize radiant heat emission, and a color of the radiation layer may be formed by adding a dye upon the surface treatment or coating. Moreover, the radiation layer 110 may be formed by various anodizing treatments, coloring, painting, application, etc. In other words, a coloring layer 111 is further formed on the radiation layer 110, so that aesthetic impression can be in terms of design achieved as well as heating performance.

In the vehicle radiation heater 100c, the heating portion 130 is provided with one or more heating elements 132, and may be formed in a rod shape. Herein, a plurality of heating elements 132 may be arranged to be distanced from each other in the heating portion 130 to form a row, or one element 132 may be provided in the heating portion 130 to have an elongated shape. In addition, the heating portion 130 may be formed such that one or more heating elements 132 may be inserted into and arranged in the casing 135 formed in a tube shape. Herein, the insulating layer 134 may be interposed between the heating elements 132 and the casing 135 such that opposite surfaces of the respective heating elements 132 are electrically insulated.

Further, the heat transfer members 150 may be made of a material having a high heat transfer coefficient such as a heat pipe or a carbon-based material (e.g., carbon nanotube). Herein, the heat transfer coefficient of the heat transfer members 150 may be equal to or greater than 500 W/m·K. In the case that the heat transfer members 150 are made of the heat pipe, a flat type heat pipe in the form of a flat plate may be used. In addition, the heat transfer members 150 may be arranged to be distanced from each other in parallel, and when viewed in a plane, sides of the heat transfer members 150, which are in close contact with the heating portion 130, may be placed at positions where the first sides of the heat transfer members overlap or are in contact with the heating elements 132 such that the heating elements 132 are adjacent to the heat transfer members 150, whereby heat transfer can be facilitated.

Although a preferred embodiment of the present invention has been described for illustrative purposes, those skilled in the art will appreciate that various modifications, additions and substitutions are possible, without departing from the scope and spirit of the invention as disclosed in the accompanying claims.

<Description of the Reference Numerals in the Drawings>

| | |
|---|---|
| 1000: vehicle radiation heater assembly | |
| 100: vehicle radiation heater | |
| 110: radiation layer | 111: coloring layer |
| 120: base member | 121: fixing member |
| 121a: adhesive member | 121b: caulking member |
| 122: seat portion | |
| 130: heating portion | 131: insulating support |
| 132: heating element | 133: electrode layer |
| 134: insulating layer | 135: casing |
| 140: heat insulating material | |
| 150: heat transfer member | |

The invention claimed is:

1. A vehicle radiation heater, comprising:
    a base member provided on a first surface thereof with a radiation layer;
    a heating portion including: a first surface on a first side and a second surface on a second side facing the first surface, the heating portion fixed to a second surface of the base member and provided therein with a heating element, the heating portion configured to generate heat; and
    a heat insulating material being in close contact with the second surface of the base member and the second surface of the heating portion, and blocking heat loss from the second surface of the base member and the second surface of the heating portion; and
    a plurality of heat transfer members interposed between the base member and the heating portion, and extending from the heating portion.

2. The vehicle radiation heater of claim 1, wherein the heating portion is formed in a rod shape having one or more heating elements.

3. The vehicle radiation heater of claim 2, wherein each of the heating elements is a positive temperature coefficient (PTC) element.

4. The vehicle radiation heater of claim 1, wherein the radiation layer is ceramic, or an oxide film formed by an anodizing process, and has a predetermined thickness to have electrical insulation.

5. The vehicle radiation heater of claim 4, wherein when the radiation layer is ceramic, the radiation layer has a thickness of 200 to 300 μm, and when the radiation layer is the oxide film formed by the anodizing process, the radiation layer has a thickness of several to several tens μm.

6. The vehicle radiation heater of claim 1, further comprising a coloring layer formed on the radiation layer, wherein the coloring layer is formed to have a color of any one of red, white, and black, or a combination color thereof.

7. The vehicle radiation heater of claim 1, wherein the heating portion includes:
    an insulating support provided therein with a plurality of space portions formed by passing through upper and lower surfaces of the insulating support, the space portions being arranged to be distanced from each other at a predetermined interval;
    a plurality of heating elements provided in the space portions, respectively;
    an electrode layer including a first electrode being in close contact with rear surfaces of the heating elements, and a second electrode being in close contact with front surfaces of the heating elements;

an insulating layer including a first insulating layer attached to a rear surface of the first electrode and a second insulating layer attached to a front surface of the second electrode; and a casing surrounding the insulating support, the heating elements, the electrode layer, and the insulating layer.

8. The vehicle radiation heater of claim 7, wherein the base member and the casing are formed integrally with each other.

9. The vehicle radiation heater of claim 1, wherein the heating portion includes:

an insulating support provided therein with a plurality of space portions formed by passing through upper and lower surfaces of the insulating support, the space portions being arranged to be distanced from each other at a predetermined interval;

a plurality of heating elements provided in the space portions, respectively;

an electrode layer including a first electrode being in close contact with rear surfaces of the heating elements;

an insulating layer including a first insulating layer attached on a rear surface of the first electrode; and a casing surrounding the insulating support, the heating elements, the electrode layer, and the insulating layer.

10. The vehicle radiation heater of claim 9, wherein the base member and the casing are formed integrally with each other.

11. The vehicle radiation heater of claim 1, further comprising:

a fixing member fixing the heating portion to the base member, wherein the fixing member is a supportive member provided on the second surface of the base member and coupled with the heating portion, or is an adhesive member including a silicone adhesive.

12. The vehicle radiation heater of claim 1, wherein the base member is provided with a seat portion formed in a shape corresponding to a shape of the heating portion on the second surface of the base member to which the heating portion is fixed.

13. The vehicle radiation heater of claim 1, wherein the heating portion is formed in a rod shape having one or more heating elements.

14. The vehicle radiation heater of claim 13, wherein each of the heating elements is a positive temperature coefficient (PTC) element.

15. The vehicle radiation heater of claim 1, wherein the radiation layer is ceramic, or an oxide film formed by an anodizing process, and has a predetermined thickness to have electrical insulation.

16. A vehicle radiation heater, comprising:

a heating portion provided therein with a heating element and generating heat;

a plurality of heat transfer members extending from the heating portion, and formed in a plate shape, the heat transfer members being provided on first surfaces thereof with a radiation layer; and a heat insulating material provided on second surfaces of the heat transfer members.

17. The vehicle radiation heater of claim 16, wherein the heating portion is formed in a rod shape having one or more heating elements.

18. The vehicle radiation heater of claim 17, wherein each of the heating elements is a positive temperature coefficient (PTC) element.

19. The vehicle radiation heater of claim 16, wherein the radiation layer is ceramic, or an oxide film formed by an anodizing process, and has a predetermined thickness to have electrical insulation.

* * * * *